(No Model.) 4 Sheets—Sheet 1.

T. A. & N. COLEMAN.
TENSION DEVICE FOR BAND SAW MILLS.

No. 579,382. Patented Mar. 23, 1897.

Witnesses:
G. A. Pennington
F. R. Cornwall

Inventors.
Thomas A. Coleman
Nathan Coleman
by Paul Bakewell
their att.

(No Model.) 4 Sheets—Sheet 2.

T. A. & N. COLEMAN.
TENSION DEVICE FOR BAND SAW MILLS.

No. 579,382. Patented Mar. 23, 1897.

(No Model.) 4 Sheets—Sheet 3.

T. A. & N. COLEMAN.
TENSION DEVICE FOR BAND SAW MILLS.

No. 579,382. Patented Mar. 23, 1897.

Witnesses:
G. A. Pennington
F. B. Cornwell

Inventors:
Thomas A. Coleman
Nathan Coleman
by Paul Bakewell (No Model.) 4 Sheets—Sheet 4.
T. A. & N. COLEMAN.
TENSION DEVICE FOR BAND SAW MILLS.
No. 579,382. Patented Mar. 23, 1897.
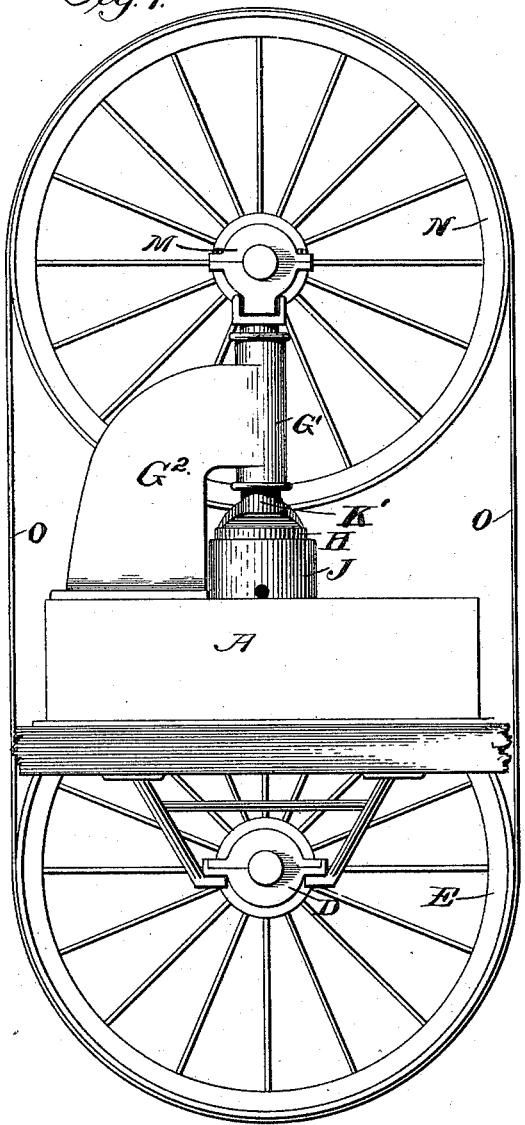
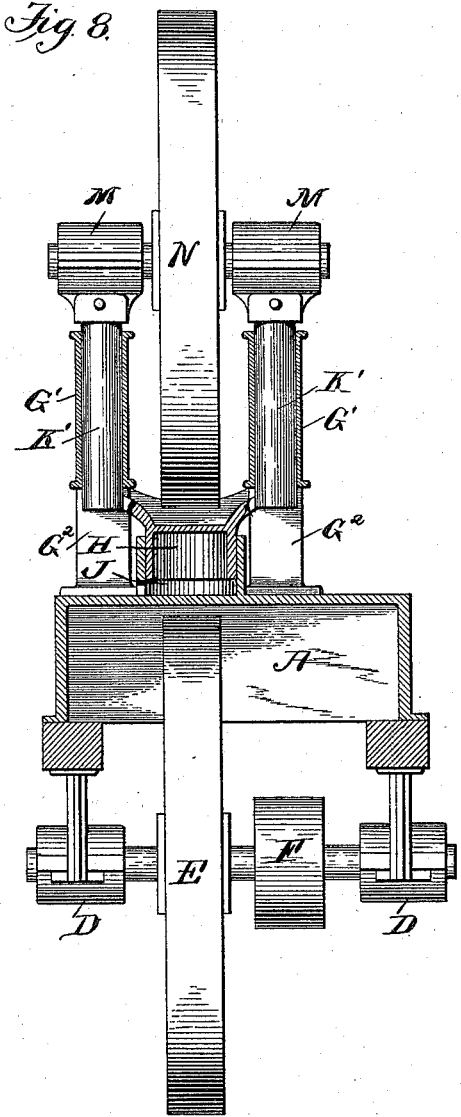
Witnesses:
G. A. Pennington
F. R. Cornwall
Inventors
Thomas A. Coleman
Nathan Coleman
by Paul Bakewell
their atty.
THE NORRIS PETERS CO., PHOTO-LITHO., WASHINGTON, D. C.

UNITED STATES PATENT OFFICE.

THOMAS A. COLEMAN AND NATHAN COLEMAN, OF TEXARKANA, TEXAS.

TENSION DEVICE FOR BAND-SAW MILLS.

SPECIFICATION forming part of Letters Patent No. 579,382, dated March 23, 1897.

Application filed July 17, 1896. Serial No. 599,462. (No model.)

*To all whom it may concern:*

Be it known that we, THOMAS A. COLEMAN and NATHAN COLEMAN, citizens of the United States, and residents of Texarkana, in the county of Bowie, State of Texas, have invented a certain new and useful Tension Device for Band-Saw Mills, of which the following is a full, clear, and exact description, reference being had to the accompanying drawings, forming a part of this specification, in which—

Figure 1:
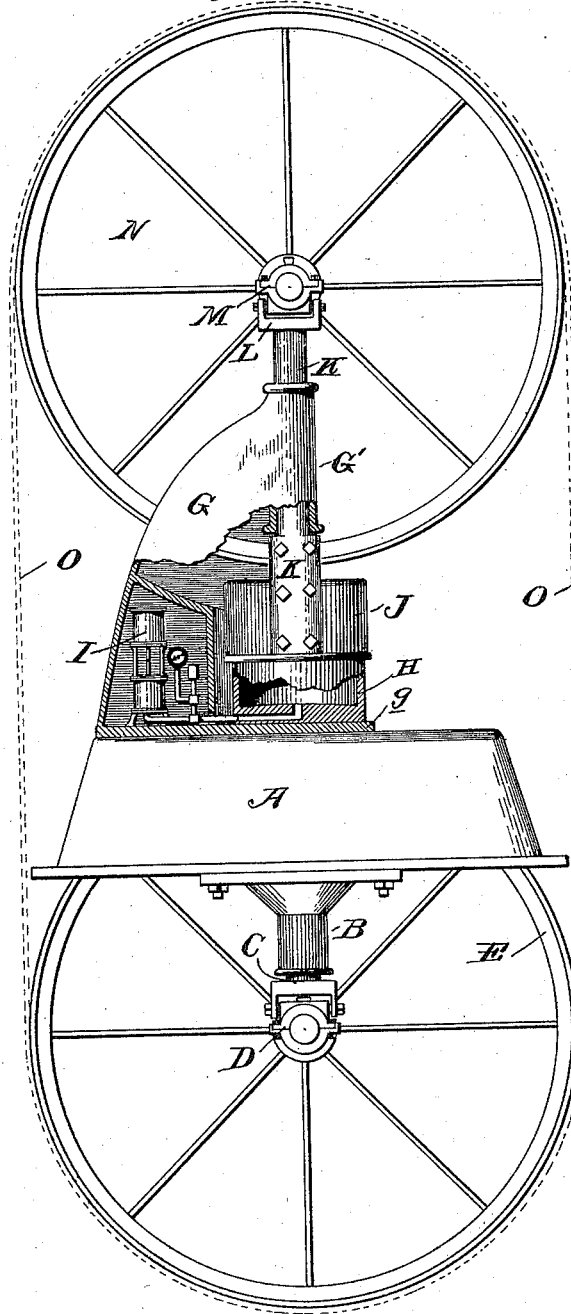
Figure 2:
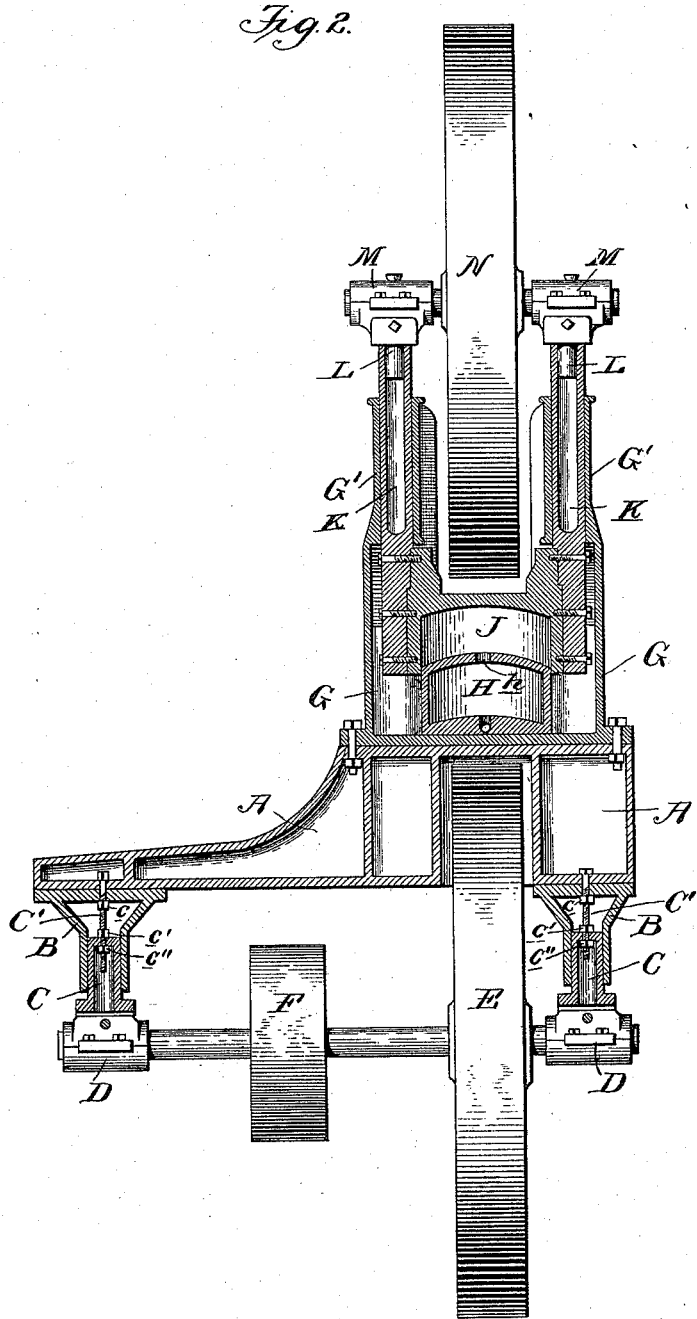
Figure 3:
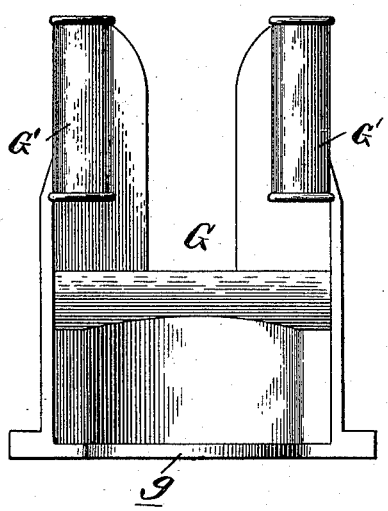
Figure 4:
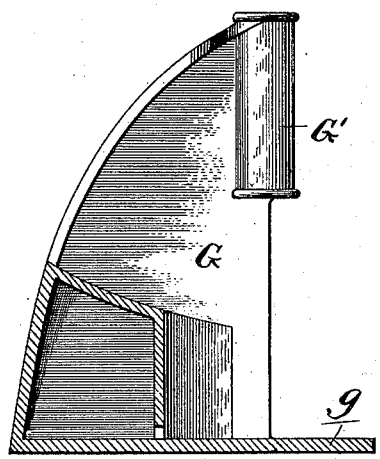
Figure 5:
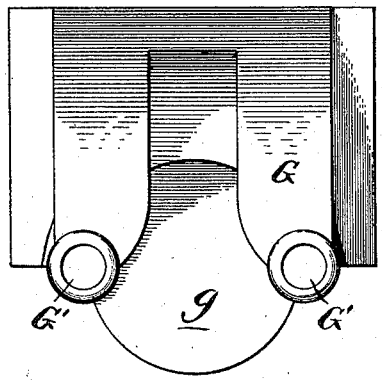
Figure 6:
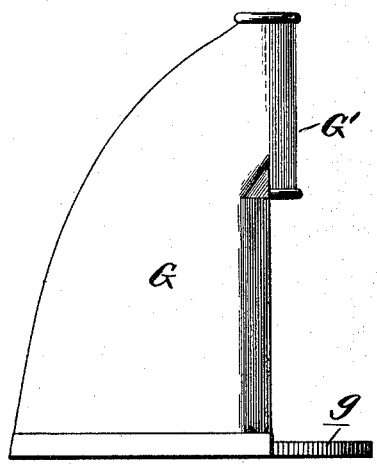

Figure 1 is a side elevational view of a band-mill provided with our improved tension device. Fig. 2 is a vertical cross-sectional view through the same. Fig. 3 is a front elevational view of the frame and guideways. Fig. 4 is a vertical sectional view through the same. Fig. 5 is a top plan view. Fig. 6 is a side elevational view. Fig. 7 is a side elevational view of a band-mill provided with a slightly-modified form of tension device. Fig. 8 is a vertical sectional view through the same.

This invention relates to a new and useful improvement in tension devices for band-saw mills; and it consists, generally stated, in mounting the upper wheel in standards which are vertically movable in suitable guideways, said standards being secured to the plunger or cylinder of a direct-acting medium, such as compressed air.

Other features of the invention reside in the construction, arrangement, and combination of the several parts, all as will hereinafter be described, and afterward pointed out in the claims.

In the drawings, A indicates a suitable base-framing, from which depend boxes B, said boxes being circular in cross-section. Arranged in these boxes and capable of vertical movement when adjusted and a partial rotary movement at all times are stems C, whose lower ends are bifurcated, so as to pivotally support journal-boxes D therein, which afford bearings for the shaft of the lower wheel E. Suitable power is imparted to this shaft through a belt (not shown) running over pulley F.

C' indicates a suitable bolt which extends down through the framing A, head of box B, and end of stem C. This bolt is threaded nearly its entire length, and a nut $c$ thereon holds the box up against the bottom of the framing. Nuts $c'$ and $c''$, above and below the end wall of the stem, adjustably hold the same in position, and said bolt being centrally disposed relative to these parts permits a partial rotary movement to accommodate any vibration of the shaft carried by the pivoted journals D.

G indicates a suitable framing bolted or otherwise secured on top of the base-framing A. This framing G is formed with suitable strengthening-webs, and on a table-like extension $g$ at its front edge is arranged a plunger H, which is preferably made hollow to receive compressed air pumped thereinto by a pump I. A suitable pressure-gage and escape-valve is arranged in connection with this hollow plunger for obvious reasons.

J indicates a cylinder open at its bottom and fitting over plunger H, there being communication between the space in the hollow plunger and cylinder-chamber through the medium of an opening $h$ in the top wall of the plunger. Secured to the sides of this cylinder in any suitable manner are standards K, which extend upwardly through guiding-sleeves G' on the framing G. The upper ends of these standards are made hollow, which hollows afford seats for stems L, whose upper ends are bifurcated, in which bifurcations are pivotally secured journal-bearings M for the shaft upon which the upper wheel N is mounted.

O indicates the saw-band.

The band being in position, in order to place the proper tension thereon, it is only necessary to start the pump or conduct compressed air to the hollow plunger, when the cylinder will be forced upwardly, carrying with it the upper wheel. The pressure will keep the band under proper tension, and any irregularities in its running will be absorbed by the expansion or contraction of the sustaining medium of the upper wheel. By the presence of the escape-valve the pump can be kept constantly in operation, if desired, which will maintain a constant and predetermined pressure in the cylinder regardless of changes of temperature.

In Figs. 7 and 8 we have shown a slightly-modified form in which the cylinder is secured to the framing $G^2$ and the standards K' are secured to the plunger. The operation is substantially the same, and the same or substantially the same parts are employed for the same purposes ascribed to the construction illustrated in Figs. 1 and 2. We deem it not necessary, therefore, to describe these parts in detail, but have used the same letters of reference for purposes of identification.

We are aware that many minor changes or alterations in the construction, arrangement, and combination of the several parts of our device can be made and substituted for those herein shown and described without in the least departing from the nature and principle of our invention.

Having thus described our invention, what we claim, and desire to secure by Letters Patent of the United States, is—

1. In a band-saw mill, the combination with the wheels for carrying the band-saw, connected supporting mechanism for the shaft-bearings, and a single fluid-actuated cylinder for supplying pressure to said supporting mechanism; substantially as described.

2. In a band-saw mill, the combination with the frame, of guides arranged on each side of said frame, standards slidingly mounted in said guides, a band-wheel mounted in the upper ends of said standards, and a cylinder common to both of said standards; substantially as described.

3. In a band-saw mill, the combination with the band-wheels, of vertically-movable standards in which the upper wheel is mounted, and a single cylinder common to said standards, for moving them in unison; substantially as described.

4. In a band-saw mill, the combination with the band-wheels, of vertically-movable standards in which the upper wheel is mounted, a single cylinder common to said standards, for moving them in unison, and universal bearings for the lower wheel, said bearings comprising a box, a stem fitting in said box, bearing-carriers in said box, and a bolt for securing the box in position, said bolt also adjusting the stem vertically, said bolt being centrally disposed relative to the parts; substantially as described.

In testimony whereof we hereunto affix our signatures, in presence of two witnesses, this 2d day of July, A. D. 1896.

THOMAS A. COLEMAN.
NATHAN COLEMAN.

Witnesses:
JOHN HAMMER,
JOHN HOLDEN.